United States Patent [19]
Kurano et al.

[11] Patent Number: 5,249,178
[45] Date of Patent: Sep. 28, 1993

[54] ROUTING SYSTEM CAPABLE OF EFFECTIVELY PROCESSING ROUTING INFORMATION

[75] Inventors: Takatoshi Kurano; Takayuki Kobayashi; Hiroshi Yamashita, all of Tokyo, Japan

[73] Assignee: NEC Corporation, Tokyo, Japan

[21] Appl. No.: 736,200

[22] Filed: Jul. 26, 1991

[30] Foreign Application Priority Data

| | | |
|---|---|---|
| Jul. 26, 1990 [JP] | Japan | 2-196144 |
| Jul. 26, 1990 [JP] | Japan | 2-196145 |
| Jul. 27, 1990 [JP] | Japan | 2-197625 |

[51] Int. Cl.⁵ ................... H04Q 11/04; H04J 3/24
[52] U.S. Cl. ................................ 370/60; 370/94.1
[58] Field of Search ............... 370/94.1, 60, 58.1, 370/58.2, 58.3, 94.2

[56] References Cited

U.S. PATENT DOCUMENTS

| | | | |
|---|---|---|---|
| 4,238,851 | 12/1980 | Takahashi et al. | 370/94.1 |
| 4,569,062 | 2/1986 | Dellande et al. | 375/117 |
| 4,586,189 | 4/1986 | Tyrrell | 375/117 |
| 5,084,867 | 1/1992 | Tachibana et al. | 370/16 |
| 5,099,475 | 3/1992 | Kozaki et al. | 370/60 |
| 5,144,619 | 9/1992 | Munter | 370/60.1 |

OTHER PUBLICATIONS

*International Zurich Seminar*, Mar. 13, 1986, Zurich, CH, pp. 25–32; J. S. Turner, "New Directions in Communications (or Which Way to the Information Age?)".
*International Switching Symposium*, vol. 2, Jun. 1, 1990, New York, US, pp. 35–44; D. G. Fisher et al, "A Flexible Network Architecture for the Introduction of the ATM".

*Primary Examiner*—Douglas W. Olms
*Assistant Examiner*—Ajit Patel
*Attorney, Agent, or Firm*—Sughrue, Mion, Zinn, Macpeak & Seas

[57] ABSTRACT

In a routing system having a plurality of external input ports and a plurality of external output ports, a switch network having a plurality of internal input ports and a plurality of internal output ports, an input section between the external input ports and the internal input ports, an output section between the internal output ports and the external output ports, and a control section connected to the switch network and the input section, an input port number which may be assigned to each of the external input ports is arranged in a routing information field of a transmission path signal by an input port number setter included in the input section. The input port number is memorized in a discarded cell memory of the control section together with an internal output port number which is assigned to the internal output ports and which is derived from a routing table along with a header. On occurrence of a discarded cell, the cause of discard can be analyzed by the use of the input port number and the header. When a plurality of external input cells are multiplexed into a multiplexed input cell sequence, the input port number may be replaced by the internal output port number in the control section to effectively utilize the routing information field.

8 Claims, 11 Drawing Sheets

ROUTING SYSTEM CAPABLE OF EFFECTIVELY PROCESSING ROUTING INFORMATION

BACKGROUND OF THE INVENTION

This invention relates to a routing system for use in connecting a plurality of input lines to a plurality of output lines.

A conventional routing system of the type described is used for transferring an asynchronous transfer mode (ATM) cell from a selected one of input lines to one or ones of output lines. To this end, the routing system comprises an ATM switch network having a plurality of input ports, a plurality of output ports, a switch circuit between the input and the output ports, and a switch control section for controlling the switch circuit. More particularly, the switch circuit is operable to form internal paths between the input and the output ports under control of the switch control section. The switch circuit comprises a plurality of switch units divided into a plurality of stages, namely, a multistage of switch units and buffers which correspond to the input ports, the output ports, or the like. The buffers serve to hold the ATM cells received at random and to avoid congestion of the ATM cells destined to a single one of the input ports or the output ports.

Furthermore, the routing system comprises an input section located between the input lines and both the switch circuit and the switch control section and an output section located between the output lines and the switch circuit.

Such a routing system is designed so that probability of collision among ATM cells becomes as small as possible and is practically reduced, for example, to $10^{-10}$. However, when serious congestion takes place among the ATM cells, the collision among the ATM cells might occur even when the probability is very low. Occurrence of the collision brings about selective abandonment or discard of the ATM cell or cells due to an overflow of each buffer. This shows that the discarded ATM cell is not transmitted to the output lines. Therefore, such occurrence of collision of ATM cells should always be detected to analyze the cause of occurrence of the discarded ATM cell. Otherwise, abandonment or discard of the ATM cell might frequently and unfavorably take place in the routing system.

In order to detect the collision of the ATM cells, each of the buffers is monitored by a counter which counts the discarded ATM cells resulting from the overflow of each buffer.

With this structure, the discarded ATM cells can be detected in number by monitoring the counts of the counters. However, it is impossible to detect input port numbers concerned with the discarded ATM cells, a routing information signal, such as the output port number, and a header or a header information signal, such as a virtual path identifier (VPI), a virtual channel identifier (VCI). This makes it difficult to analyze the cause of occurrence of the discarded ATM cells.

In another conventional routing system, a plurality of external input cells each of which usually has a cell length of fifty-three (53) bytes are multiplexed by an input section into an internal multiplexed input cell sequence which is sent to a switch circuit through each of input ports of the ATM switch network. On the other hand, each internal multiplexed input cell sequence is separated by an output section into a plurality of external output cells sent through the output lines.

Herein, it is to be noted that the internal multiplexed input cell sequence is delivered to the switch circuit at a rate higher than that of the external input cells and that the switch circuit should be operated at a high speed. Such a high speed operation is not always desirable for the switch circuit.

Taking this into consideration, attention is directed to parallel processing of bits of each cell of the internal multiplexed input cell sequence in the switch circuit. However, such parallel processing is practically difficult because the byte number of fifty-three (53) included in each cell is a prime number. Specifically, if a switch unit is assigned to each bit of the cell, this requires the use of the switch units of 53×8, namely, 424 so as to carry out the parallel processing at every stage.

Under the circumstances, the cell length of 53 bytes is converted into a converted cell length of, for example, 54 bytes, 56 bytes, or 64 bytes. This shows an empty field is left in a converted cell having the converted cell length. Such conversion of cell lengths facilitates parallel processing and makes it possible to reduce an amount of hardware because the switch units can be reduced in number, as known in the art.

In general, a routing information signal of a multistage switch is located in the empty field of the converted cell. Thus, if the routing information signal is located in the empty field, an amount of routing information is unpleasingly increased as a size of the switch circuit becomes large. Therefore, the converted cell length should be determined in dependency upon an amount of information carried by the routing information signal. This makes it difficult to cope with change or expansion of a size of the switch network.

On the other hand, proposal is made about transferring the routing information signal through a different signal line and another switch circuit different from the switching circuit for transfer of each cell. However, necessity of the different signal line and the different switch circuit makes a size of hardware objectionably large.

At any rate, the above-mentioned processing of each input cell is not always optimum in each conventional routing system so as to analyze the discarded cell and to transmit the routing information signal. This is because the routing information signal is not effectively used in the conventional routing systems.

SUMMARY OF THE INVENTION

It is an object of this invention to provide a routing system which is capable of favorably processing each cell in various manners.

It is another object of this invention to provide a routing system of the type described, which is capable of desirably processing a discarded cell which might occur on an overflow of each buffer.

It is yet another object of this invention to provide a routing system of the type described, which is capable of favorably processing each cell so as to readily cope with expansion of a size of the routing system without an increase of hardware.

A routing system to which this invention is applicable is for use in connection between a plurality of external input ports and a plurality of external output ports. The routing system comprises a switch network having a plurality of internal input ports, a plurality of internal output ports, and a switch circuit between the internal input and the internal output ports, an input section between the external input ports and the internal input ports, an output section between the internal output ports and the external output ports, and a control section coupled to the input section and the switch circuit for controlling the switch circuit to form internal paths between the internal input ports and the internal output ports. Each of the external input ports is successively supplied with an external input cell which carries a header identifying the input cell, the external input ports and the external output ports having external input port numbers and external output port numbers assigned thereto, respectively, while the internal input ports and the internal output ports have internal input port numbers and internal output port numbers.

According to an aspect of this invention, the input section comprises port number producing means responsive to each of the external input cells and located between each of the external input ports and each of the internal input ports for producing an input port number signal representative of a selected one of the external and the internal input port numbers and an output port number signal representative of one of the internal output port numbers, and signal supply means responsive to each of the external input cells, the input port number signal, and the output port number signal for supplying each of the external input cells and the header to the switch circuit and the control section, respectively. The input port number signal and the output port number signal are supplied to the control section together with the header. In addition, the control section comprises switch control means supplied with the header and the output port number signal for controlling the switch circuit on the basis of the header and the output port number signal to form the internal paths and processing means supplied with the header and at least one of the output port number signal and the input port number signal for processing the header by the use of the at least one of the input port number signal and the output port number signal to analyze each of the external input ports.

According to another aspect of this invention, the input section comprises first format converting means coupled to the external input ports for converting the cell formats of the input cells into internal formats each of which has a routing information field for a routing information signal together with the payload field and the header field, to produce converted cells having the routing information fields, port number assigning means coupled to the first format converting means for assigning first port numbers related to the external input port numbers to the routing information fields of the converted cells as the routing information signals to produce internal cells which carry the first input port numbers in the routing information fields, respectively, a cell multiplexing unit coupled to the port number assigning means for multiplexing the internal cells into an internal multiplexed input cell sequence which has multiplexed input cells carrying the first input port numbers, number specifying means coupled to the cell multiplexing unit and a selected one of the internal input ports for specifying, on the basis of the first input port numbers and the header fields of the multiplexed input cells, a selected one of the internal output port numbers and a selected one of second port numbers related to the external output port numbers, the number specifying means successively replacing the first port numbers by the selected one of the second port numbers to form replaced multiplexed cells, and transferring means coupled to the switch network and the control section for transferring the replaced multiplexed cells and the selected one of the internal output port numbers to the switch network and the control section, respectively. The control section comprises means coupled to the transferring means and the switch circuit for controlling the switch circuit on the basis of the selected one of the internal output port numbers to form the internal paths. The output section comprises separating means coupled to a selected one of the internal output ports specified by the selected one of the internal output port numbers and supplied with the replaced multiplexed cells for separating the replaced multiplexed cells on the basis of the selected one of the second port numbers into external output cells and delivery means for successively delivering the external output cells to the external output ports.

DESCRIPTION OF THE PREFERRED EMBODIMENTS

Figure 1:
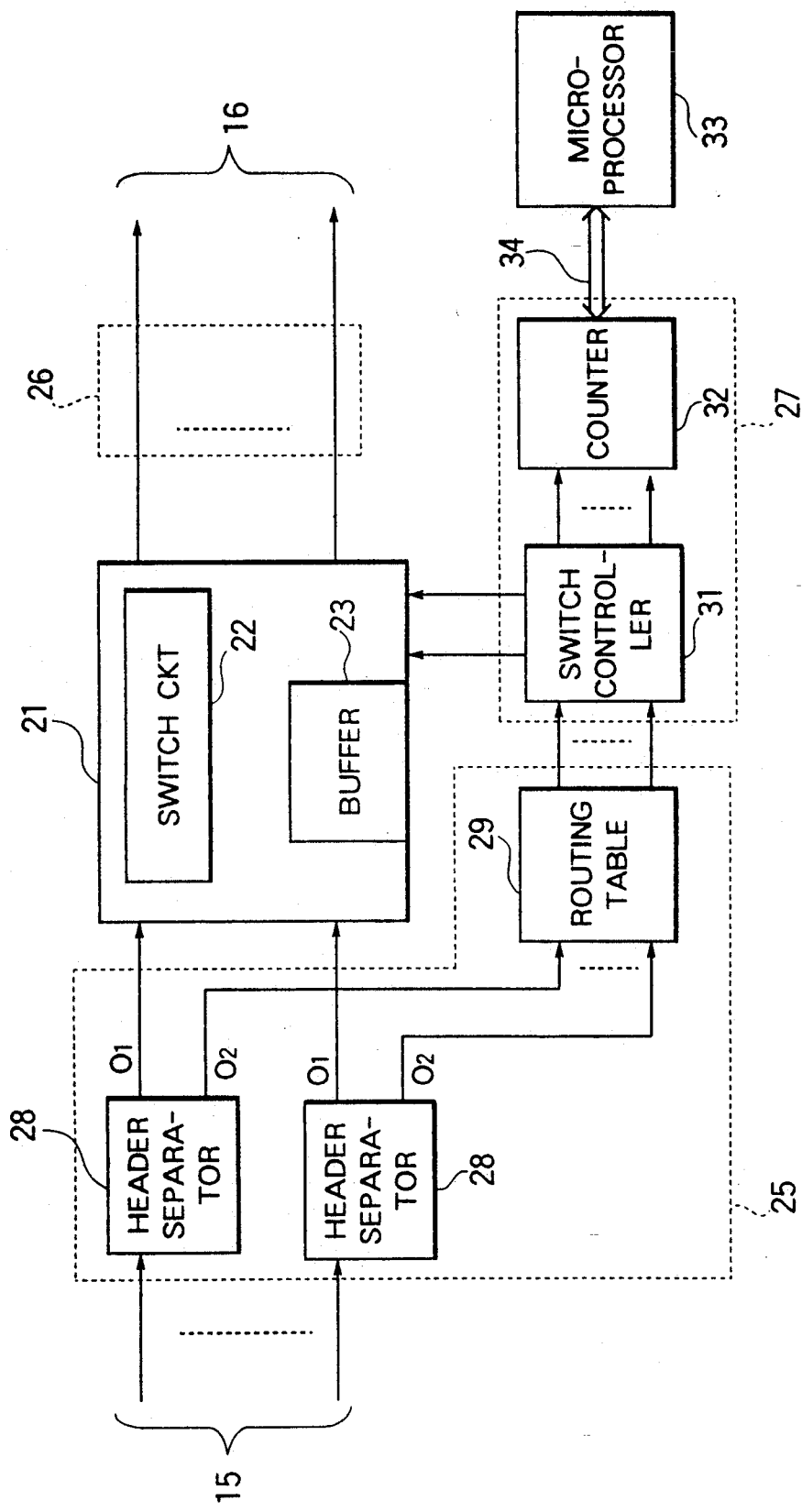
FIG. 1 is a block diagram of a conventional routing system.

Referring to FIG. 1, a conventional routing system is exemplified for a better understanding of this invention and is used for connection between a plurality of input ports 15 and a plurality of output ports 16. The input and the output ports 15 and 16 are connected to input lines and output lines and will be also called external input ports and external output ports to which external input port numbers and external output port numbers are assigned. It is assumed that the illustrated routing system serves to form a route or routes of each of asynchronous transfer mode (ATM) cells.

The routing system comprises a switch network 21 having a plurality of input ports (may be called switch input ports) and a plurality of output ports (may be called switch output ports) to which input and output port numbers are assigned, respectively. The switch network 21 comprises a switch circuit 22 and a buffer 23 which serves to store the ATM cells for each input port, each output port, or the like. Without loss of generality, it may be considered that the switch circuit 22 is composed of switch units of j×k where j and k are integers greater than unity.

In FIG. 1, the routing system further comprises an input section 25 between the external input ports 15 and the switch input ports of the switch network 21, an output section 26 between the switch output ports of the switch network 21 and the external output ports 16, and a control section 27 coupled to the input section 25 and the switch network 21.

Herein, it is to be noted that each of the ATM cells is composed of fifty-three (53) bytes and has a header field of five bytes and a payload field of forty-eight bytes. The header field is assigned with a header, such as a virtual path identifier (VPI), a virtual channel identifier (VCI) for specifying a path or a channel to be delivered while the payload field is assigned with a transmission data signal sent through each external input port 15. Each ATM cell is given to each external input port 15 as an input cell or an external input cell.

In the example being illustrated, the input section 25 comprises a plurality of header separators 28 connected to the external input ports 15, respectively. Each of the header separators 28 allows each of the ATM cells to pass therethrough as a first output signal 01 on one hand and separates the header from each of the input cells as a second output signal 02 on the other hand. The first output signal 01 is sent to the switch network 21 while the second output signal 02 is delivered to a routing table 29 which forms a part of the input section 25 and which memorizes the output port number or a switch output port number of the switch network 21 corresponding to each header.

Supplied with the header from each of the header separators 28, the routing table 29 produces the switch output port number on the basis of the header, namely, the VPI and the VCI and transfers the same to the control section 27.

The illustrated control section 27 comprises a switch controller 31 coupled to the routing table 29 and a counter section 32 coupled to the switch controller 31. The switch controller 31 controls the buffers 23 and carries out routing control of the switch circuit 22 on the basis of the switch output port number read out of the routing table 29.

When an overflow takes place in a selected one of the buffers 23, one of the input cells is extinct or discarded from the selected buffer. The switch controller 31 detects discard or extinction of one of the input cells to inform the counter section 32 of the discarded input cell. The counter section 32 comprises a plurality of counters corresponding to the buffers 23. Therefore, each of the counters successively counts the discarded input cells in each of the buffers 23.

The counters are monitored by a monitoring microprocessor 33 connected to the counters through a bus 34. Each count of the counters is sent to the monitoring microprocessor 33 at a predetermined time interval and is thereafter reset. Thus, the monitoring microprocessor 33 monitors the discarded input cells on the basis of the counts within the predetermined time interval.

With this structure, it is possible to monitor only the numbers of the input cells discarded within the predetermined time interval. In other words, it is difficult to know the input port number, the VPI, and the VCI corresponding to the discarded input cells. As a result, the routing system is disadvantageous in that the cause can not be sufficiently analyzed about the discarded input cells, as mentioned before.

In addition, it is to be noted in the illustrated example that the external input port numbers are identical with the switch input port numbers and the external output port numbers are identical with the switch output port numbers.

In FIG. 1, each of the header separators 28 may be connected to a cell multiplexer (not shown in FIG. 1) which is coupled to a plurality of external input ports 15 corresponding to the input lines. The external input port numbers are assigned to the external input ports, as mentioned before. In this event, the cell multiplexer multiplexes a plurality of input cells from the plurality of the external input ports into an internal multiplexed input cell sequence which is sent to each switch input port of the switch network 21 through the header separator 28 and which has a bit rate higher than that of each input cell. In this connection, the input cell and a multiplexed cell of the internal multiplexed input cell sequence may be referred to as a low speed input cell and a high speed input cell, respectively. It is to be noted in the above-mentioned structure that the external input port numbers are different from the input port numbers, namely, switch input port numbers.

When the cell multiplexers are connected to the header separators 28, the output section 26 illustrated in FIG. 1 comprises a plurality of cell separators (not shown in FIG. 1) each of which separates a received or an internal multiplexed output cell sequence from each switch output port of the switch network 21 into a plurality of internal output cells each of which has a bit rate lower than that of the received multiplexed cell. Accordingly, the received multiplexed cell of the internal multiplexed output cell sequence and the output cell may be called a high speed output cell and a low speed output cell, respectively. The low speed output cells are sent as external output cells through the external output ports which have the external output port numbers, respectively.

Figure 2:
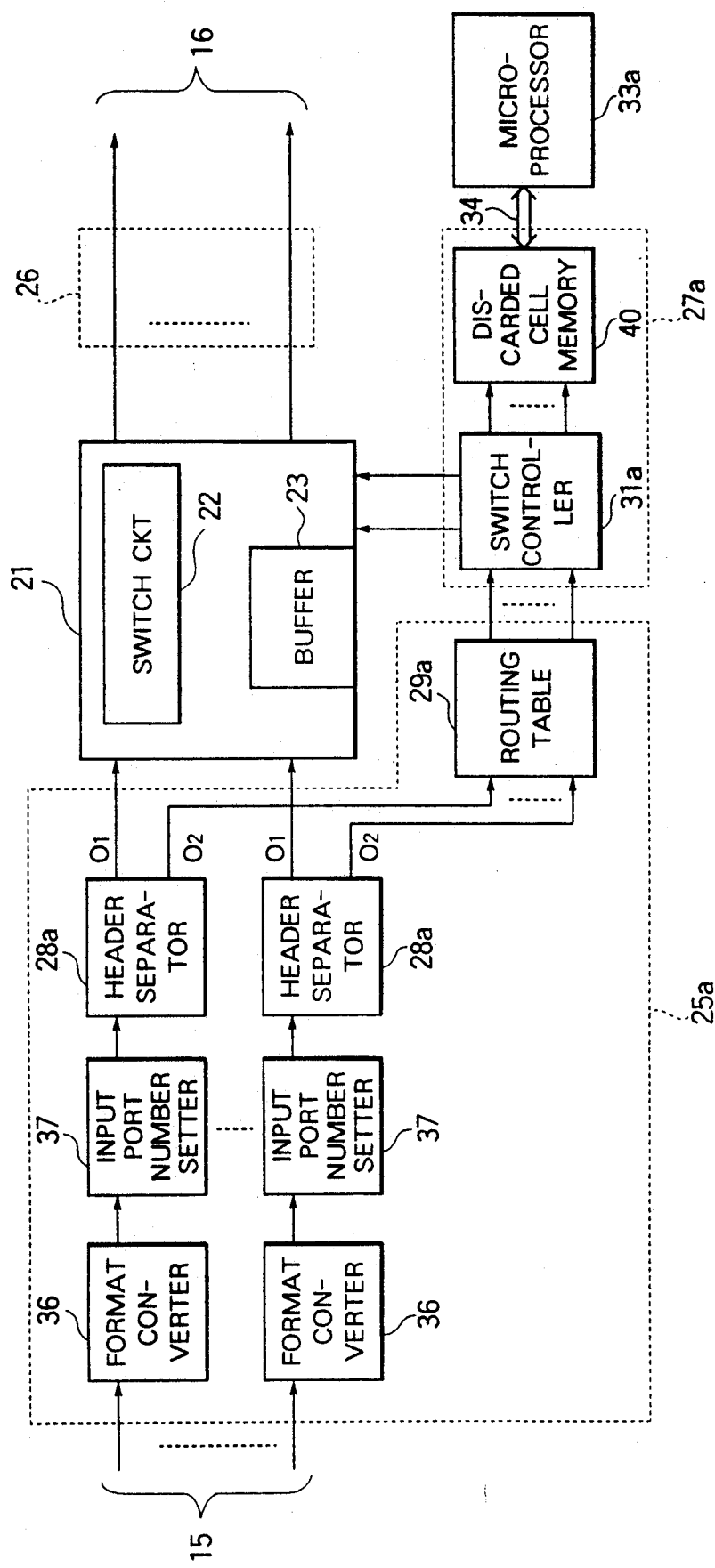
FIG. 2 is a block diagram of a routing system according to a first embodiment of this invention.

Referring to FIG. 2, a routing system according to a first embodiment of this invention is similar in structure to that illustrated in FIG. 1 except that an input section, a control section, and a microprocessor are operated in different manners from those illustrated in FIG. 1 and are therefore designated by reference numbers 25a, 27a, and 33a. In the example being illustrated, the input section 25a is supplied through the external input ports 15 with external input cells each of which is composed of fifty-three bytes and which carries a header of five bytes and a payload of forty-eight bytes arranged in a header field and a payload field, respectively, like in FIG. 1. The header may be a virtual path identifier (VPI) or a virtual channel identifier (VCI).

The routing system comprises a plurality of format converters 36 which are connected to the respective external input ports 15 like in the conventional routing system, although they are omitted from FIG. 1. Each format converter 36 serves to convert each external input cell of fifty-three bytes into an internal input cell of, for example, fifty-six bytes, with the header and the payload kept unchanged. From this fact, it is readily understood that each of the internal input cells includes an empty field of two bytes as a result of format conversion in each format converter 36. Each of the internal input cells is delivered to an input port number setter 37.

Figure 3:
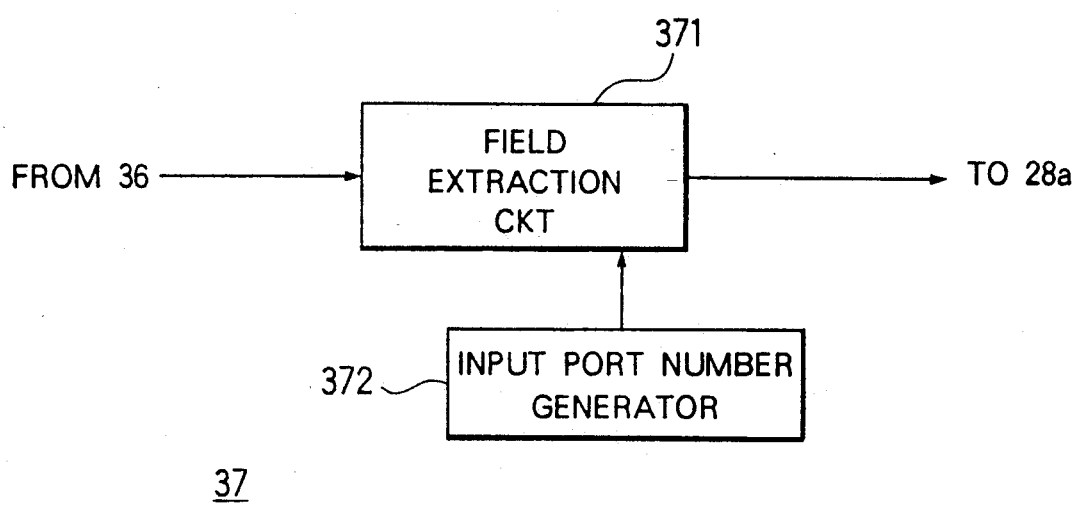
FIG. 3 is a block diagram of an input port number setter used in the routing system illustrated in FIG. 2.

Referring to FIG. 3 together with FIG. 2, the input port number setter 37 comprises a field extraction circuit 371 and an input port number generator 372. The input port number generator 372 generates an external input port number assigned to each of the external input ports 15. Inasmuch as the external input cells are not multiplexed in the illustrated routing system, the external input port number is identical with the switch input port of the switch network 21.

The field extraction circuit 371 is supplied from the format converter 36 with the internal input cell and detects the empty field of the internal input cell. When the empty field of the internal input cell is detected by the field extraction circuit 371, the external input port number is sent from the input port number generator 372 and arranged as a routing information signal in the empty field of each internal input cell. In this connection, the empty field may be called a routing information field. Thus, the external input port number is sent to a header separator 28a together with the header.

In FIG. 2, the header separator 28a allows the internal input cell to pass therethrough as a first output signal 01 on one hand and separates the header field and the routing information field from the internal input cell. As a result, the header and the external input port number are separated by the header separator 28a and sent as a second output signal 02 to a routing table 29a which memorizes an output port number, namely, a switch output port number in correspondence to each header, namely, the VPI or the VCI. At any rate, the switch output port number is read out of the routing table 29a on the basis of each header and is transferred to a control section 27a along with the header and the external input port number sent from the header separator 28a.

The control section 27a comprises a switch controller 31a and a discarded cell memory 40. The switch controller 31a receives the switch output port number, the header, and the external input port number. The switch controller 31a controls the buffers 23 of the switch network 21 and executes routing control on the basis of the switch output port number, like the switch controller 31 illustrated in FIG. 2. Moreover, when an overflow takes place in a selected one of the buffers 23 and one of the internal input cells is rendered into a discarded cell, the switch controller 31a writes, into the discarded cell memory 40, the header and the external input port number which corresponds to the discarded cell and which is memorized as a hysteresis information signal. A monitoring microprocessor 33a reads the hysteresis information signal, namely, the header and the external input port number out of the discarded cell memory 40 through the bus 34 to analyze a hysteresis of the discarded cell.

As mentioned before, the header and the external input port number are transferred as the hysteresis information signal to the discarded cell memory 40. Therefore, the microprocessor 33a can readily analyze the cause of discard in connection with the discarded cell. Particularly, when an ATM switch circuit of a bit slice type is used as the switch circuit 22, the cause of discard can be analyzed without restructuring a bit-sliced cell.

Figure 4:
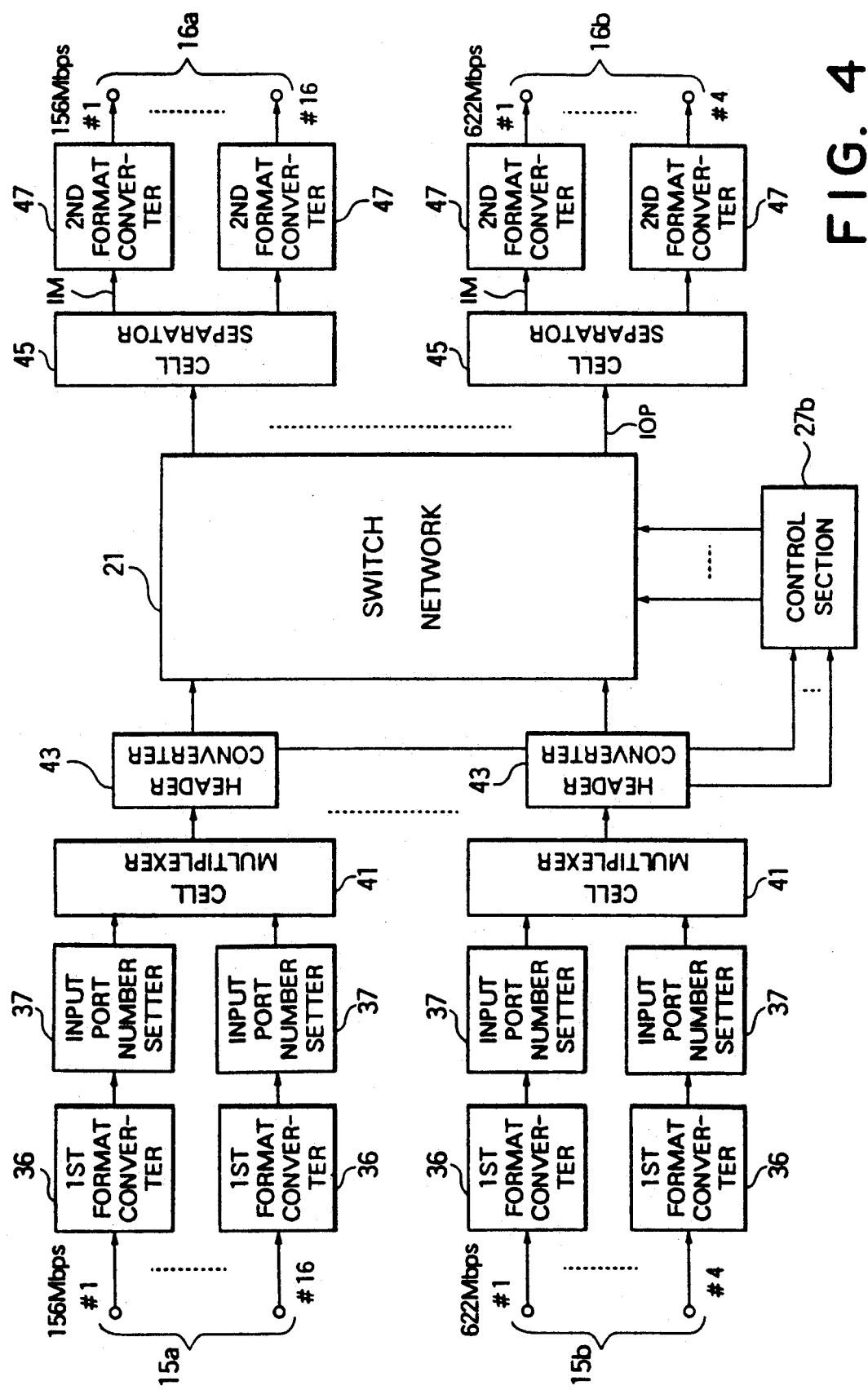
FIG. 4 is a block diagram of a routing system according to a second embodiment of this invention.

Referring to FIG. 4, a routing system according to a second embodiment of this invention multiplexes a plurality of external input cells. In FIG. 4, the routing system has external input ports 15 and external output ports 16 connected to input lines and output lines. The external input ports 15 are classified into a plurality of input port groups, as specified by 15a and 15b in FIG. 4, and the external output ports are also classified into a plurality of output port groups, as specified by 16a and 16b. It is assumed that the input port group 15a which may be called a first input port group is supplied with external input cells of a bit rate of 15.52 Mbps while the input port group 15b which may be called a second input port group is supplied with external input cells of a bit rate of 622.08 Mbps. Similarly, the external output port group 16a which may be called a first output port group is supplied with external output cells of 15.52 Mbps while the external output port group 16b which may be called a second output port group is supplied with external output cells of 622.08 Mbps. In the illustrated example, it is further assumed that the external input cells of each of the first and the second external input groups are multiplexed into an internal multiplexed input cell sequence which is composed of a plurality of multiplexed input cells of 2488.32 Mbps.

In this connection, the first external input group 15a is composed of sixteen external input ports, as indicated at #1 to #16 while the second external input group 15b is composed of four external input ports, as indicated at #1 to #4. Likewise, the first external output port group 16a is composed of sixteen external output ports, as indicated at #1 to #16, and the second external output port group 16b is composed of four external output ports, as indicated at #1 to #4.

Herein, let the external input cells be successively delivered to each of the external input ports 15 (suffixes omitted) in the form of a transmission path signal. In FIG. 4, each transmission path signal is supplied to a format converter 36, like in FIG. 2. Each of the format converters 36 may be called a first format converter and may be similar to that illustrated in FIG. 2.

Figure 5:
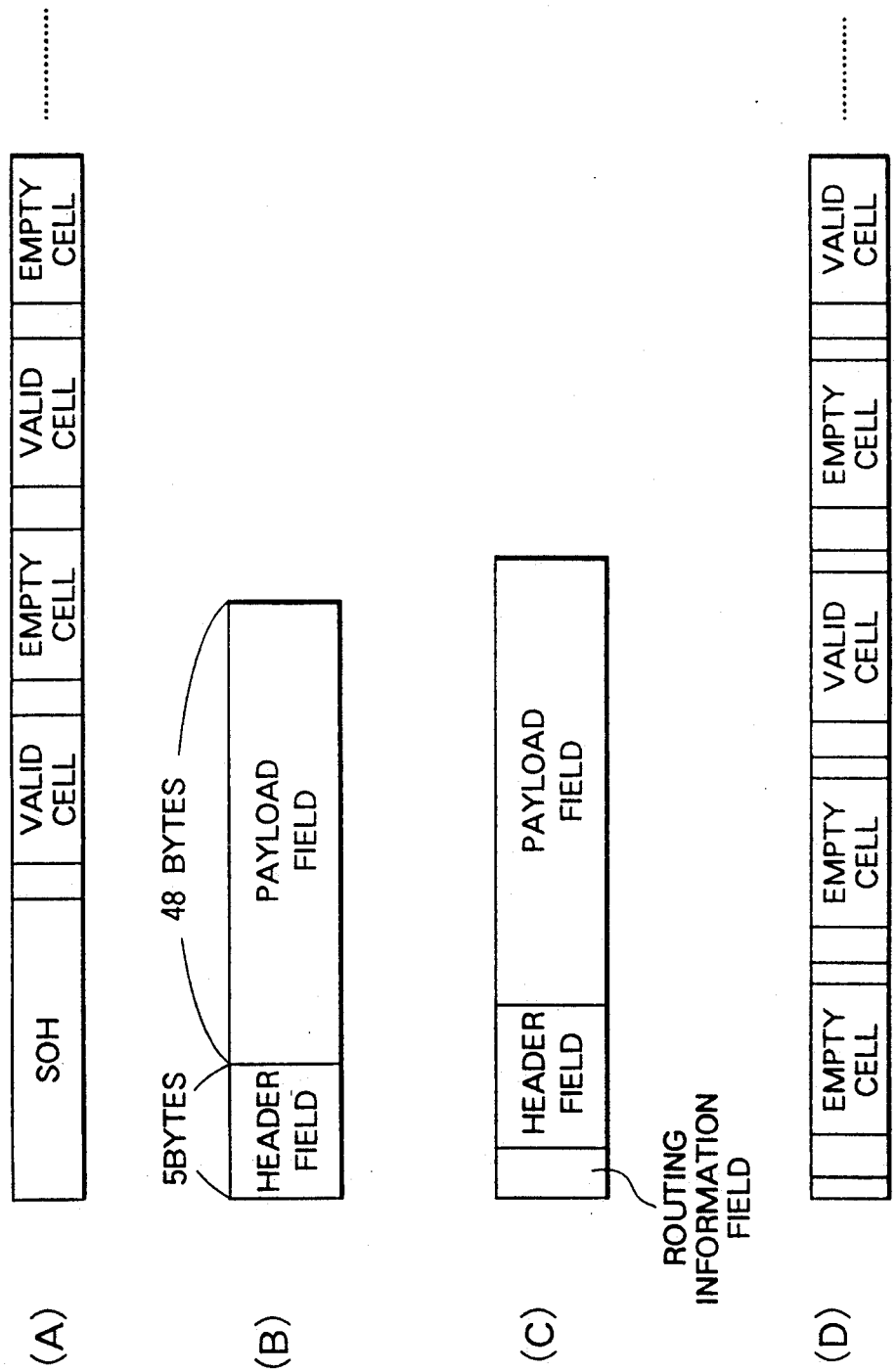
FIG. 5 is a time chart for use in describing operation of the routing system illustrated in FIG. 4.

Referring to FIG. 5, each of the transmission path signals includes an overhead area, such as a section overhead (SOH) area, valid cells, and empty cells, as illustrated in FIG. 5(A). Each of the valid and the empty cells is preceded by the header to form an external input cell, as mentioned in connection with FIG. 2.

At any rate, the external input cell of fifty-three bytes has the header field of five bytes and the payload field of forty-eight bytes, as illustrated in FIG. 5(B).

The first format converter 36 illustrated in FIG. 4 is supplied with the transmission path signal and converts the transmission path signal into an internal signal, as shown in FIG. 5(B). Each internal signal comprises the valid cells and the empty cells like the transmission path signal. In addition, a routing information field and a header field are attached to each of the valid and the empty cells to form the internal input cell, as illustrated in FIG. 5(C). The routing information field is used in a manner to be described later in detail. The routing information field has a length of, for example, two bytes. As a result, the first format converter 36 successively produces the internal signal, as illustrated in FIG. 5(D).

Figure 6:
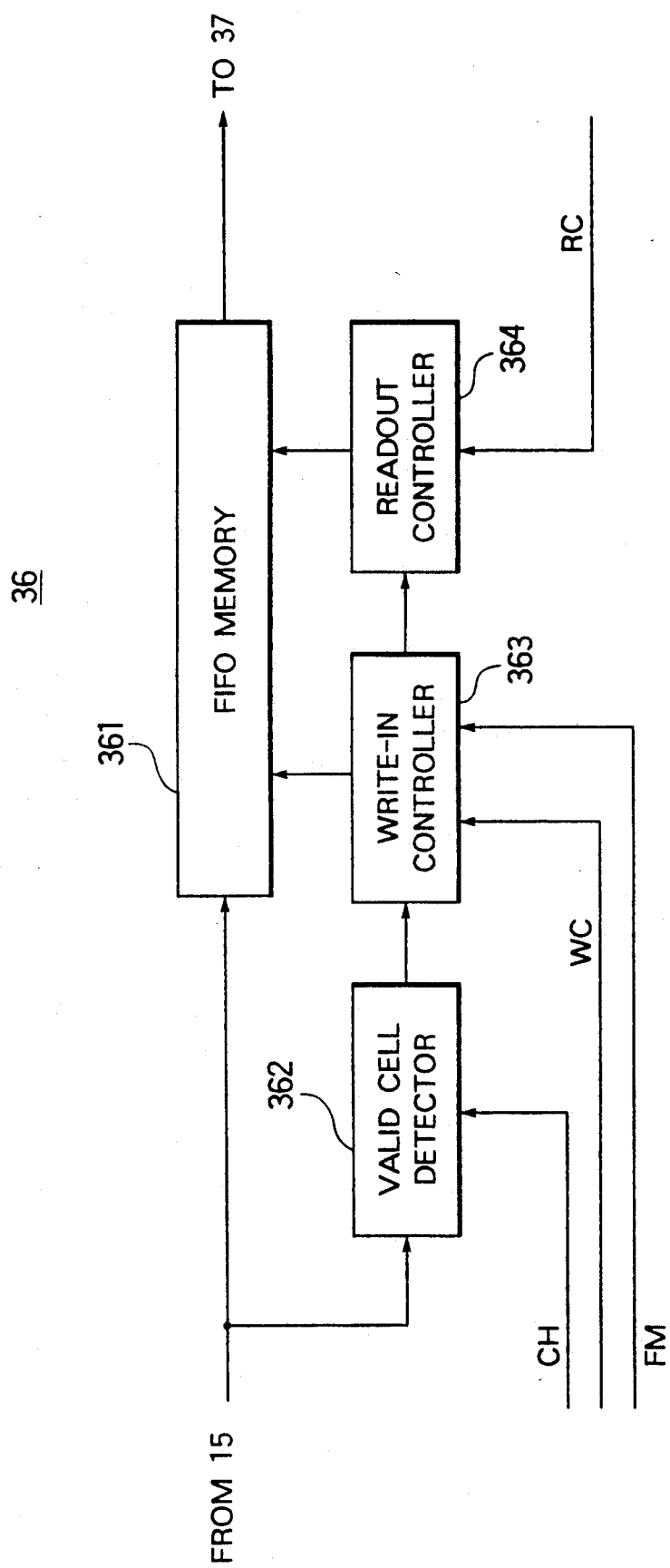
FIG. 6 is a block diagram of a format converter used in the routing system illustrated in FIG. 4.

Referring to FIG. 6 together with FIG. 4, the format converter 36 comprises a first-in first-out (FIFO) memory 361, a valid cell detector 362, a write-in controller 363, and a readout controller 364. The transmission path signal is supplied to both the FIFO memory 361 and the valid cell detector 362. In the valid cell detector 362, each valid cell alone is successively detected in response to a cell head signal CH which is indicative of the head of each cell. Supplied with the cell head signal CH and the transmission path signal, the valid cell detector 362 detects the valid cells one by one with reference to the cell head signal CH. As a result, the valid cell detector 362 successively supplies the write-in controller 363 with a valid cell detection signal which is synchronized with each valid cell and which is representative of detection of each valid cell.

The illustrated write-in controller 363 is given a frame signal FM of the transmission path signal and a write-in clock WC together with the valid cell detection signal. The write-in controller 363 delivers a write-in timing signal to the FIFO memory 361 with reference to the valid cell detection signal, the frame signal FM, and the write-in clock WC. Thus, the write-in timing signal is sent from the write-in controller 363 to the FIFO memory 361 in synchronism with each valid cell. As a result, the FIFO 361 successively memorizes, as memorized cells, only the valid cells sent from each external input port 15 under control of the write-in controller 363.

The memorized cells are successively read out of the FIFO memory 361 to produce the internal signal (as illustrated in FIG. 5(D)) under control of the readout controller 364. Specifically, the readout controller 364 controls the FIFO memory 361 so that the routing information field is added to a leading portion of each valid cell and each memorized cell is read out of the FIFO memory 361 with phases adjusted to those assigned to the memorized cells. In this case, if the valid cell does not exist in the FIFO memory 361, the empty cell is produced from the FIFO memory 361 under control of the readout controller 364, as shown in FIG. 6.

Thus, the internal signal is delivered from each of the first format controllers 36 to the corresponding input port number setter 37 which may be similar in structure and operation to that illustrated in conjunction with FIGS. 2 and 3. At any rate, the external input port number is arranged in the routing information field of each internal input cell in the manner mentioned in conjunction with FIG. 3.

Referring back to FIG. 4, the internal signals produced from the first and the second external input groups are multiplexed by cell multiplexers into the internal multiplexed input cell sequences. The internal multiplexed input cell sequences are sent to input ports, namely, switch input ports of a switch network 21 through header converters 43. The switch network 21 may be similar in structure to that illustrated in FIG. 2 and the input ports may be called high speed input ports.

Figure 7:
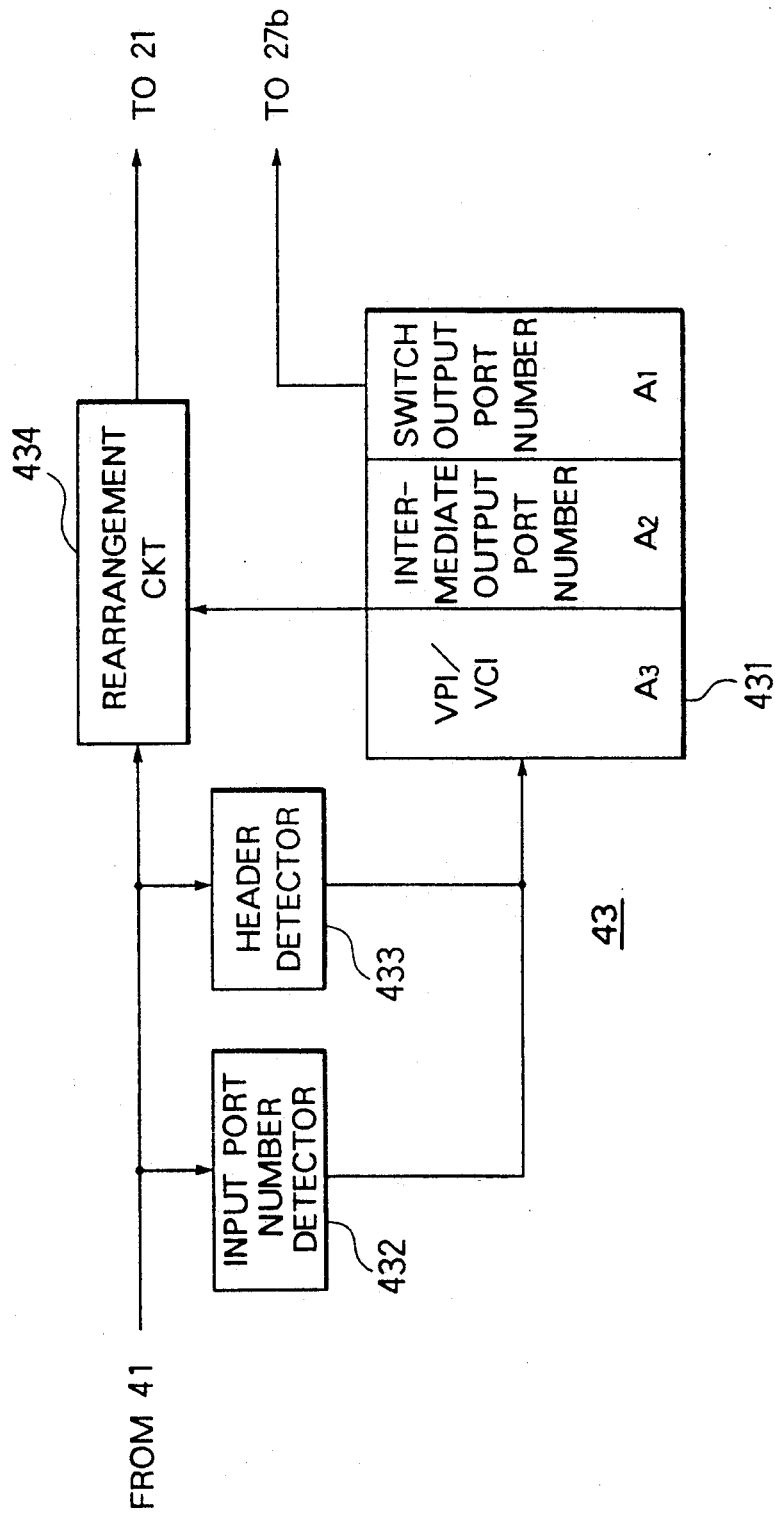
FIG. 7 is a block diagram of a header converter used in the routing system illustrated in FIG. 4.

Referring to FIG. 7 together with FIG. 4, each of the header converters 43 comprises a header conversion table 431, an input port number detector 432, a header detector 433, and a rearrangement circuit 434. As described with reference to FIGS. 3, 4, and 5, each multiplexed cell of the internal multiplexed input cell sequence has the routing information field for the external input port number in addition to the header field and the payload field and will be called an internal multiplexed input cell.

In FIG. 7, the internal multiplexed input cell is supplied with the input port number detector 432, the header detector 433, and the rearrangement circuit 434. The input port number detector 432 detects the external input port from each internal multiplexed input cell to produce a port number detection signal representative of a detected external input port number while the header detector 433 detects the header, such as the virtual path identifier (VPI), the virtual channel identifier (VCI) to produce a header detection signal representative of a detected header. A combination of the header detection signal and the port number detection signal is delivered as an address signal to the header conversion table 431.

Temporarily referring to FIG. 4, the illustrated switch network 21 has a plurality of output ports, namely, switch output ports which may be called high speed output ports or internal output ports assigned with internal output port numbers IOP and which are connected to a plurality of cell separators 45. Each of the cell separators 45 has a plurality of intermediate output ports classified into the first and the second external output port groups 16a and 16b. The intermediate output ports are assigned with intermediate output port numbers IM, respectively. Each of the intermediate output ports is connected to a second format converter 47 which will be described later in detail.

In FIG. 7, the header conversion table 431 has a first area A1 for memorizing the internal or switch output port numbers IOP of the switch network 21, a second area A2 for memorizing the intermediate output port numbers IM, and a third area A3 for memorizing the headers, such as VPI's or VCI's. When a combination of the header detection signal and the port number detection signal is given to the header conversion table 431 as the address signal, a set of the internal output port number IOP, the intermediate output port number IM, and the header is simultaneously read out of an address of the header conversion table 431 that is specified by the address signal.

The internal output port number IOP is sent as a readout output port number to a control section 27b illustrated in FIG. 4 while the intermediate output port number IM and the header are sent to the rearrangement circuit 434 as a readout intermediate output port number and a readout header.

The rearrangement circuit 434 replaces the external input port number and the header of each internal multiplexed input cell by the readout intermediate output port number and the readout header. As a result, each of the internal multiplexed input cells bears the readout intermediate output port number and the readout header in the routing information field and the header field, respectively, and is delivered to the switch network 21.

Such replacement of the external input port number by the readout intermediate output port number can avoid an increase of the routing information field and reduces an amount of the routing information signal to a minimum. In addition, the readout output port number is delivered through a signal line to the control section 27b.

Figure 8:
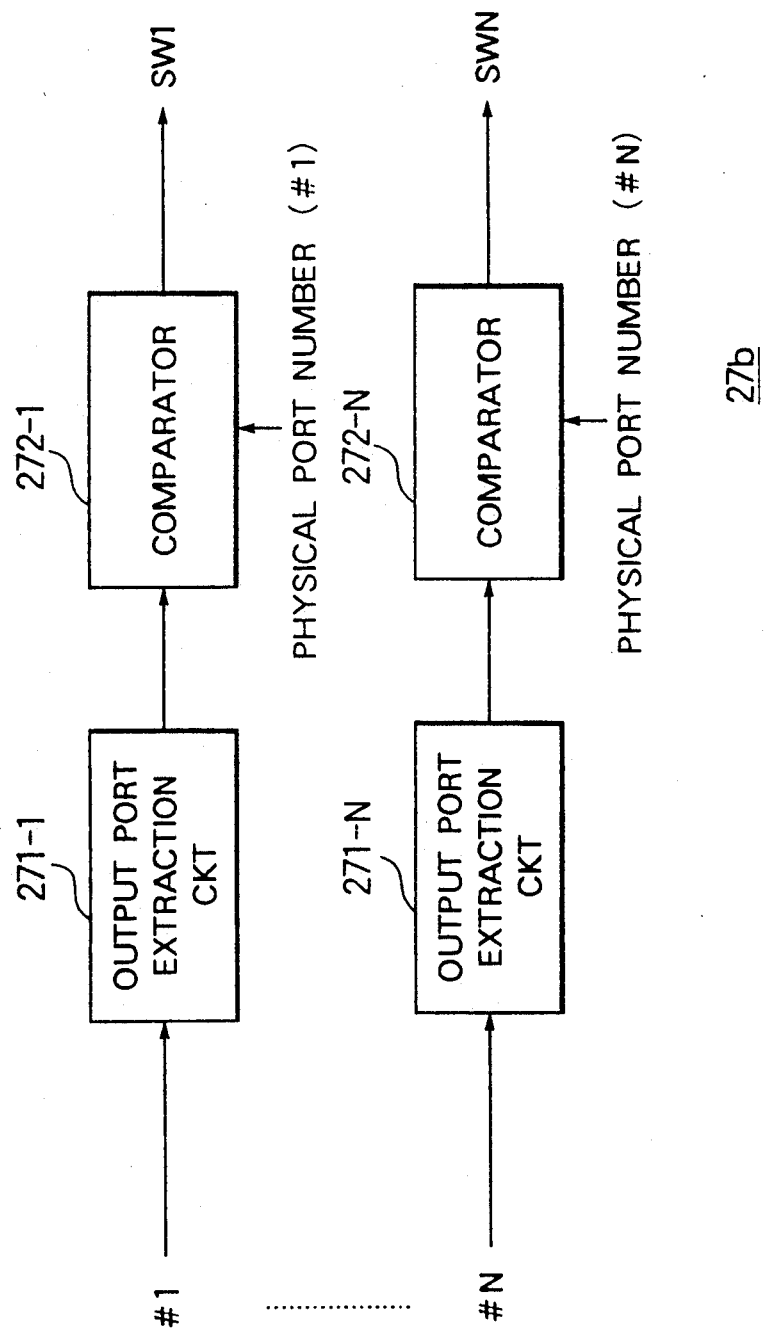
FIG. 8 is a block diagram of a control section used in the routing system illustrated in FIG. 4.

Referring to FIG. 8 in addition to FIG. 4, the control section 27b comprises a plurality of output port extraction circuits 271 connected to the header converters 43 and a plurality of comparators 272 connected to the respective output port extraction circuits 271. Without loss of generality, it is assumed that the illustrated control section 27b comprises first through N-th ones of the output port extraction circuits 271-1 to 271-N together with first through N-th ones of the comparators 272-1 to 272-N. The first through the N-th output port extraction circuits 271-1 to 271-N extract the readout output port numbers to successively supply extracted output port numbers to the first through the N-th comparators 272-1 to 272-N. Thus, each of the extracted output port numbers is sent to each of the first through the N-th comparators 272-1 to 272-N which are given first through N-th physical port numbers assigned to the respective comparators 272-1 to 272-N in correspondence to first through N-th ones of the switch output ports of the switch network 21. When coincidence is detected between the extracted output port numbers and the physical output port numbers as a result of comparison, first through N-th switch control signals SW1 to SWN are delivered from the respective comparators 272-1 to 272-N to the switch network 21.

The internal multiplexed input cells which bear the replaced or readout output port numbers are sent as internal multiplexed output cells to the internal or switch output ports IOP of the switch network 21 in accordance with the switch control signals SW1 to SWN and thereafter delivered to the cell separators 45 illustrated in FIG. 4.

The cell separators 45 demultiplex the internal multiplexed output cells into internal output cells on the basis of the intermediate output port numbers IM carried by the internal multiplexed output cells. The internal output cells are supplied through the second format converters 47 to the respective external output ports 16a to 16b.

Figure 9:
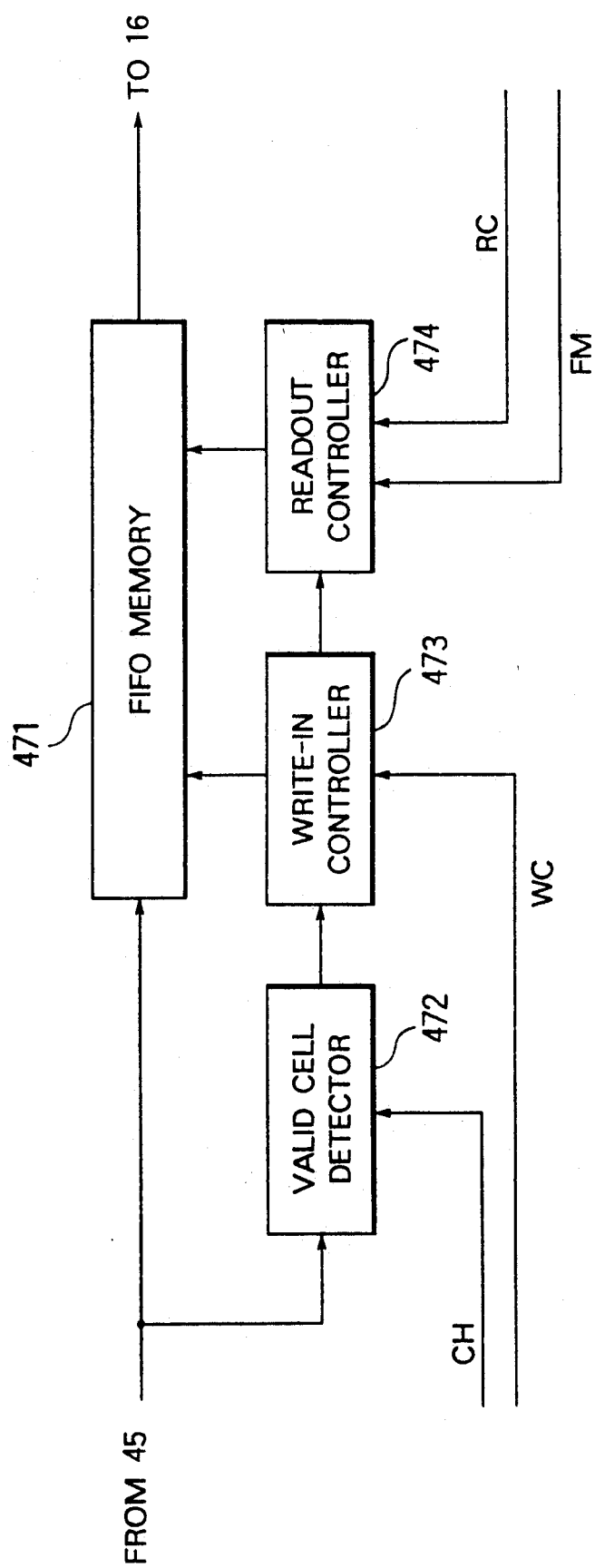
FIG. 9 is a block diagram of another format converter used in the routing system illustrated in FIG. 4.

Referring to FIG. 9 together with FIG. 4, each of the second format converters 47 is for use in converting the internal output cell into a transmission path output cell which may be similar to the transmission path input cell supplied through the external input ports 15a to 15b. Like in FIG. 6, the illustrated second format converter 47 comprises a first-in first-out (FIFO) memory 471, a valid cell detector 472, a write-in controller 473, and a readout controller 474.

In FIG. 9, the intermediate output cells are successively supplied to both the first-in first-out memory 471 and the valid cell detector 472. The illustrated valid cell detector 472 is operable in response to a cell head signal representative of a head of each cell to check each header field of the intermediate output cells and to detect a valid cell. On detection of each valid cell, the valid cell detector 472 produces a valid cell detection signal representative of detection of each valid cell. The valid cell detection signal is sent to the write-in controller 473 operable in response to a sequence of write-in clocks WC. The write-in controller 473 delivers a sequence of write-in timing signals to the first-in first-out memory 471 in synchronism with each valid cell of the intermediate output cells. As a result, only the valid cells are successively memorized into the first-in first-out memory 471. In this event, the write-in controller 473 controls the first-in first-out memory 471 so that each routing information field preceding each valid cell is not written into the first-in first-out memory 471.

After the valid cells are memorized in the first-in first-out memory 471 in the above-mentioned manner, the readout controller 474 carries out readout control with reference to a sequence of readout clocks RC and a transmission path frame signal FM. Specifically, the valid cells are successively read out of the first-in first-out memory 471 on the basis of each phase of the transmission path frame signal FM. Such a readout operation is carried out except for an overhead region, such as section overhead region (SOH) for a transmission frame. In addition, when no valid cell is memorized in the first-in first-out memory 471, an empty cell is transmitted. Thus, the external output cells have the same format as the external input cells, as illustrated in FIG. 5(A), and are successively transmitted through each external output port 16.

From this fact, it is readily understood that the external input port number is arranged in the routing information field and is replaced by the intermediate output port number. Therefore, the routing information field may not be widened even if an amount of the routing information becomes large. This brings about a reduction of a size of hardware. In addition, when the intermediate output port number is identical with the external output port number, the external output port number may be replaced in the routing information field.

Figure 10:
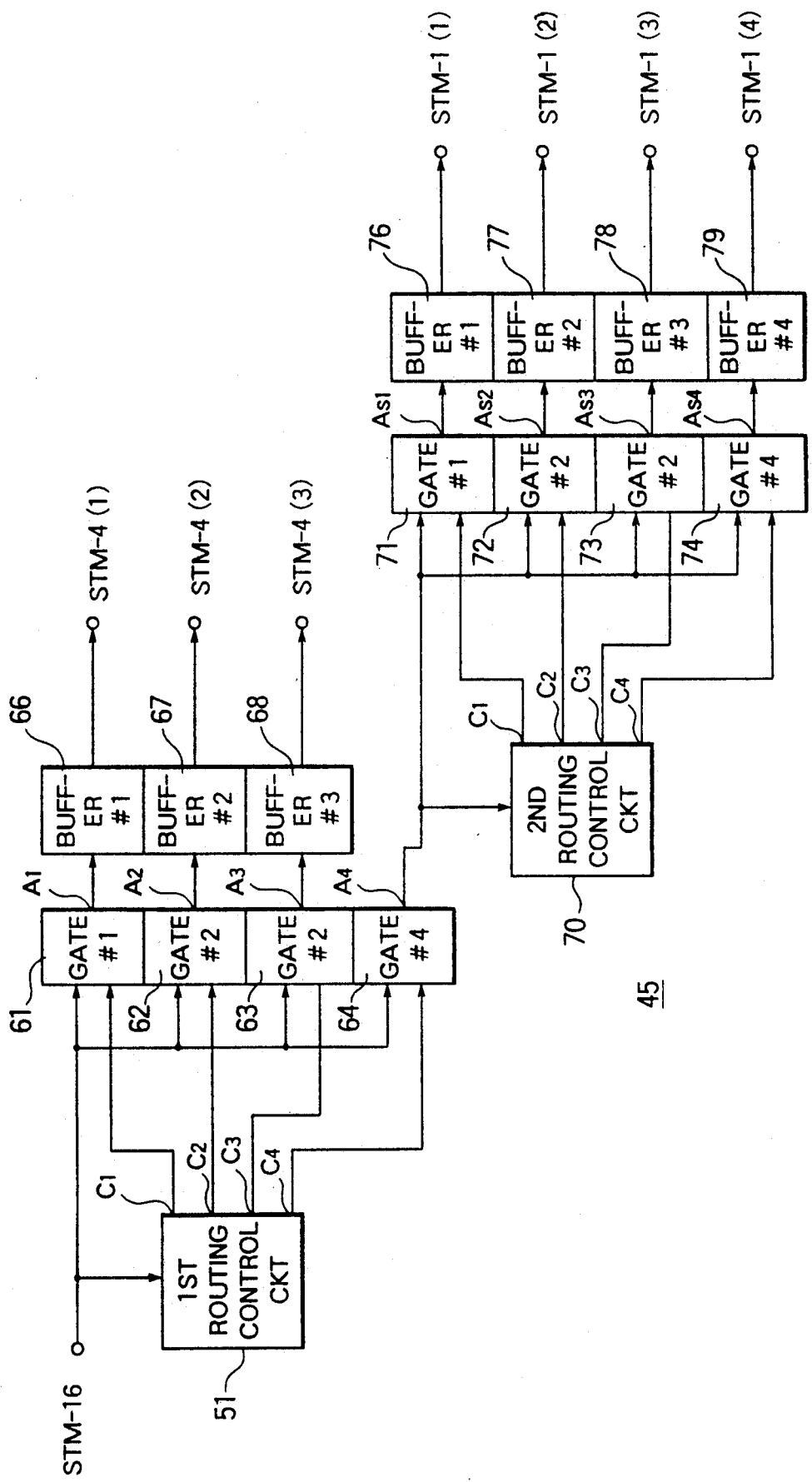
FIG. 10 is a block diagram of a separator according to a third embodiment of this invention.

Referring to FIG. 10, a cell separator or demultiplexer, as depicted at 45, is applicable to that illustrated in FIG. 4 and is for use in separating an internal multiplexed output cell sequence into individual cells. Herein, it is assumed that a plurality of asynchronous transfer mode (ATM) cells each of which has a predetermined cell length of 53 bytes are multiplexed into the internal multiplexed output cell sequence and that the internal multiplexed output cell sequence is produced as a predetermined synchronous transfer mode (STM) cell sequence which may be specified by STM-m, where m is representative of a degree of multiplicity and is an integer greater than unity. From this fact, it is readily understood that the STM cell sequence is multiplexed at each STM unit, namely, an STM-1 assigned to a data field of, for example, a virtual container (VC)-4$_{NC}$ which is known in the art and which is composed of 2340 bytes. In this event, let each of the asynchronous transfer mode (ATM) cells be located in the STM unit.

Briefly, the illustrated cell separator 45 serves to separate the STM-m into STM-i where i is an integer smaller than m and is a variable. In FIG. 10, it is assumed that m takes sixteen while i takes four and unity. In this connection, the internal multiplexed output cell of the STM-16 is separated by the cell separator 45 into four cell sequences of the STM-4 one of which is also separated into four cell sequences of the STM-1. From this fact, it is to be noted that the illustrated cell separator 45 is supplied with the internal multiplexed output cell of the STM-16 to produce first through third cell sequences of the STM-4 indicated at STM-4(1) to (3) and a fourth cell sequence of the STM-4 which is also separated into first through fourth cell sequences of the STM-1 which are indicated at STM-1(1) to (4).

Figure 11:
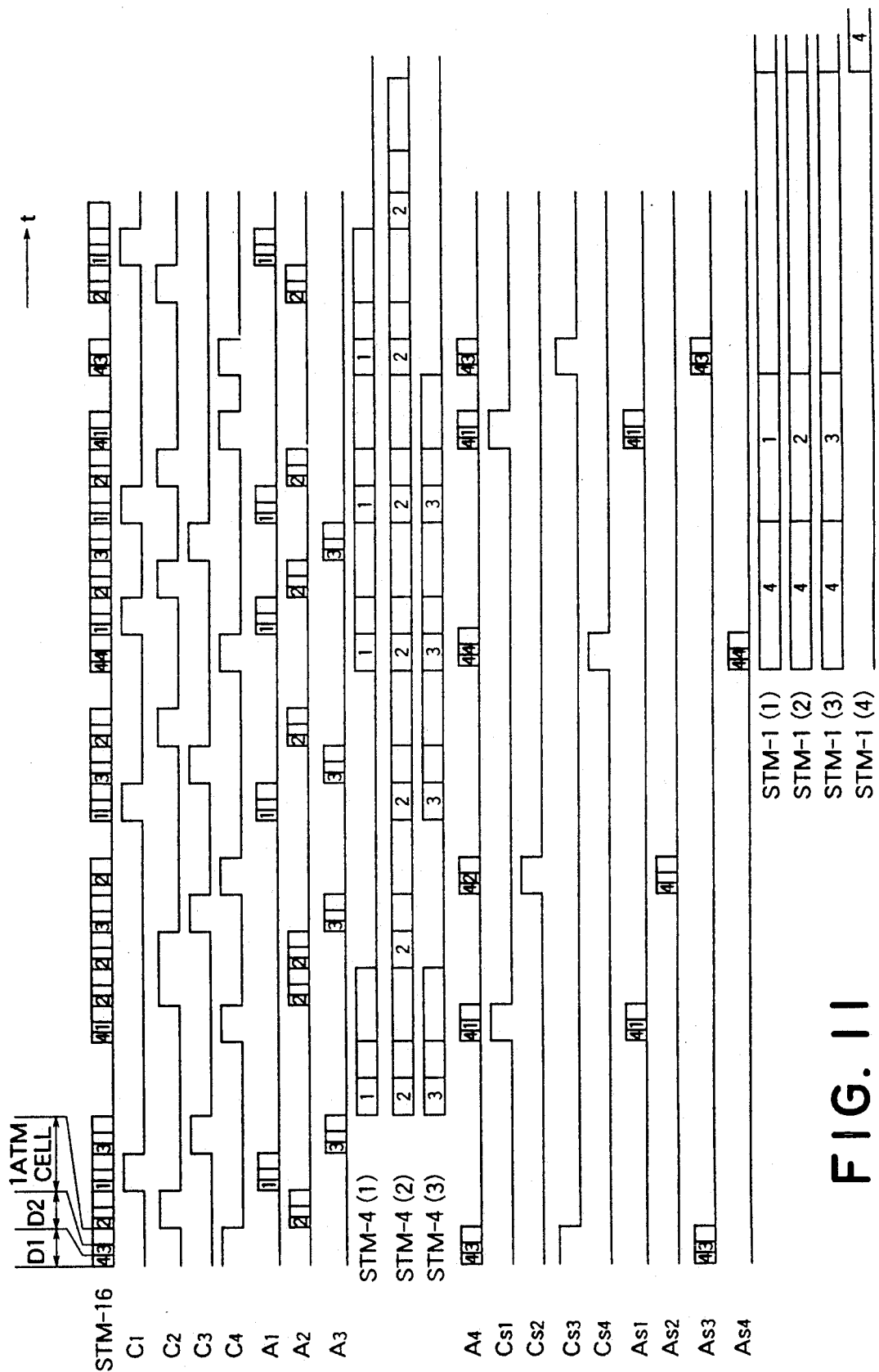
FIG. 11 is a time chart for use in describing operation of the separator illustrated in FIG. 10.

Referring to FIG. 11 afresh and FIG. 10, the internal multiplexed output signal of the STM-16 is supplied to a first routing control circuit 51 on one hand and first through fourth primary gates 61 to 64 on the other hand. As shown in FIG. 10, a leftmost one of the internal multiplexed output cell sequences (the STM-16) carries a first destination address signal D1 of the STM-4 and a second destination signal D2 of the STM-1 followed by a single ATM cell. The illustrated first and second destination address signals D1 and D2 are equal to 4 and 3, respectively. A combination of the first and the second destination address signals D1 and D2 shows that the following ATM cell is separated into the third cell sequence (STM-1(3)) of the fourth cell sequence of the STM-4(4).

In the leftmost internal multiplexed output sequence STM-16, the remaining numbers 2, 1, and 3 represent the second, the first, and the third cell sequences of the STM-4(2), (1), and (3), respectively. This applies to the other cell sequences illustrated in FIG. 10.

In FIG. 10, the first routing control circuit 51 delivers first through fourth primary control signals C1 to C4 to the first through the fourth primary gates 61 to 64, respectively. The first through the fourth primary control signals C1 to C4 are produced in synchronism with first through fourth destination address signals, as shown in FIG. 10, which are sent to the first through the fourth primary gates 61 to 64, respectively. Supplied with the first through the fourth primary control signals C1 to C4, the first through the fourth primary gates 61 to 64 are opened to pass the first through the fourth destination address signals and the following ATM cells which may be called first through fourth separated cells A1 to A4, respectively.

The first through the third separated cells A1 to A3 are memorized into first through third primary buffers 66 to 68 to be read out of them as the first through the third cell sequences of the STM-4(1), (2), and (3).

On the other hand, the fourth separated cell A4 is delivered to both a second routing control circuit 70 and first through fourth secondary gates 71 to 74. The second routing control circuit 70 successively detects the second destination signal D2 from a sequence of the fourth separated cells A4 to produce first through fourth secondary control signals Cs1 to Cs4 which are synchronized with first through fourth ones of cells included in the fourth separated cell sequence A4, as illustrated in FIG. 11, and which are sent to the first through the fourth secondary gates 71 to 74. As a result, the first through the fourth secondary gates 71 to 74 are opened to allow the STM-1(1) through STM-1(4) to pass therethrough as first through fourth secondary cells As1 to As4. The first through the fourth secondary cells As1 to As4 are memorized into first through fourth secondary buffers 76 to 79 to be produced as the STM-1(1) to STM-1(4).

The cell sequences STM-4(1) to (3) are subjected to frequency conversion so that they have frequencies determined for the STM-4(1) to (3). Likewise, the cell sequences STM-1(1) to (4) are also subjected to frequency conversion and have frequencies determined for them.

Thus, it is possible for the illustrated cell separator to separate a sequence of STM-m into a plurality of sequences of STM-i with each of the ATM cells being switched. In addition, a combination of the cell separators enables a hierarchic switching operation of the ATM cells and separation of the STM cells. This structure makes it possible to distribute the switching operation of the ATM cells.

While this invention has thus far been described in conjunction with a few embodiments thereof, it will be possible for those skilled in the art to put this invention into practice in various other manners.

What is claimed is:

1. In a routing system for use in connection between a plurality of external input ports and a plurality of external output ports, said routing system comprising a switch network having a plurality of internal input ports, a plurality of internal output ports, and a switch circuit between said internal input ports and said internal output ports, an input section between said external input ports and said internal input ports, an output section between said internal output ports and said external output ports, and a control section coupled to said input section and said switch circuit for controlling said switch circuit to form internal paths between said internal input ports and said internal output ports, each of said external input ports being successively supplied with external input cells which carry headers identifying said external input cells, said external input ports and said external output ports having external input port numbers and external output port numbers assigned thereto, respectively, while said internal input ports and said internal output ports have internal input port numbers and internal output port numbers, the improvement wherein:

said input section comprises:
port number producing means responsive to each of said external input cells and located between each of said external input ports and each of said internal input ports for producing input port number signals corresponding to respective ones of said external input cells representative of a selected one of said external input port numbers and said internal input port numbers and output port number signals corresponding to respective ones of said external input cells representative of one of said internal output port numbers; and
signal supply means responsive to each of said external input cells, said input port number signals and said output port number signals for supplying each of said external input cells and each of said headers to said switch circuit and said control section, respectively, said input port number signals and said output port number signals being supplied to said control section together with said headers;
said control section comprising:
switch control means supplied with said headers and said output port number signals for controlling said switch circuit on the basis of said headers and said output port number signals to form said internal paths; and
processing means supplied with said headers and at least one of said output port number signals and said input port number signals for processing said headers by the use of said at least one of said input port number signals and said output port number signals to analyze each of said external input ports.

2. A routing system as claimed in claim 1, wherein each of said headers is formed by at least one of a virtual path identifier and a virtual channel identifier for identifying a path and a channel to deliver each of said external input cells.

3. A routing system as claimed in claim 1, wherein said processing means comprises:
memorizing means coupled to said signal supply means for memorizing said input port number signals and said headers to produce said input port number signals and said headers as memorized input port number signals and memorized headers, respectively; and
means coupled to said memorizing means for analyzing a hysteresis of each of said external input cells on the basis of said memorized headers and said memorized input port number signals.

4. A routing system for use in connection between a plurality of external input ports and a plurality of external output ports, said routing system comprising a switch network having a plurality of internal input ports, a plurality of internal output ports, and a switch circuit between said internal input ports and said internal output ports, an input section between said external input ports and said internal input ports, an output section between said internal output ports and said external output ports, and a control section coupled to said input section and said switch circuit for controlling said switch circuit to form internal paths between said internal input ports and said internal output ports, each of said external input ports being supplied with external input cells each of which has a cell format divided into a payload field for transmission information and a header field for a header identifying a corresponding one of said external input cells, said external input ports and said external output ports having external input port numbers and external output port numbers assigned thereto, respectively, while said internal input ports and said internal output ports have internal input port numbers and internal output port numbers assigned thereto, respectively;

said input section comprising:

first format converting means coupled to the external input ports for converting the cell format of each of said external input cells into an internal format which has a routing information field for a routing information signal together with said payload field and said header field, to produce converted cells each having said routing information field;

port number assigning means coupled to said first format converting means for assigning first port numbers related to the external input port numbers to the routing information field of respective ones of the converted cells as routing information signals to produce internal cells each of which carry a respective one of said first port numbers in said routing information field,;

a cell multiplexing unit coupled to said port number assigning means for multiplexing the internal cells into an internal multiplexed input cell sequence which has multiplexed input cells carrying the first port numbers;

number specifying means coupled to said cell multiplexing unit and a selected one of said internal input ports for specifying, on the basis of the first port numbers and header fields of said multiplexed input cells, a selected one of said internal output port number and a selected one of second port numbers related to said external output port numbers, said number specifying means successively replacing the first port numbers by said selected one of the second port numbers to form replaced multiplexed cells; and transferring means coupled to said switch network and said control section for transferring said replaced multiplexed cells and said selected one of the internal output port numbers to said switch network and said control section, respectively;

said control section comprising:

means coupled to said transferring means and said switch circuit for controlling said switch circuit on the basis of said selected one of the internal output port numbers to form said internal paths;

said output section comprising:

separating means coupled to a selected one of the internal output ports specified by said selected one of the internal output port numbers and supplied with said replaced multiplexed cells for separating said replaced multiplexed cells on the basis of said selected one of the second port numbers into external output cells; and delivery means for successively delivering said external output cells to said external output ports.

5. A routing system as claimed in claim 4, said cell multiplexing unit having intermediate input ports which are connected to said external input ports through said port number assigning means and which have intermediate input port numbers assigned thereto, wherein said port number assigning means assigns, as said first port numbers, said intermediate input port numbers to said internal cells.

6. A routing system as claimed in claim 5, said separating means having intermediate output ports which are connected to said external output ports through said delivery means and which have intermediate output port numbers assigned thereto, wherein said number specifying means specifies, as said second port numbers, said intermediate output port numbers.

7. A routing system as claimed in claim 4, wherein said port number assigning means assigns, as said first port numbers, said external input port numbers to said internal cells.

8. A routing system as claimed in claim 7, wherein said number specifying means specifies, as said second port numbers, said external output port numbers.

* * * * *